Dec. 1, 1931.   R. W. ERDLE   1,834,123
METHOD OF MAKING SWAGED DENTURE BASES AND DIES FOR THE SAME
Filed June 25, 1930   2 Sheets-Sheet 1
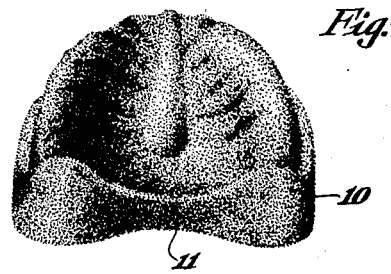
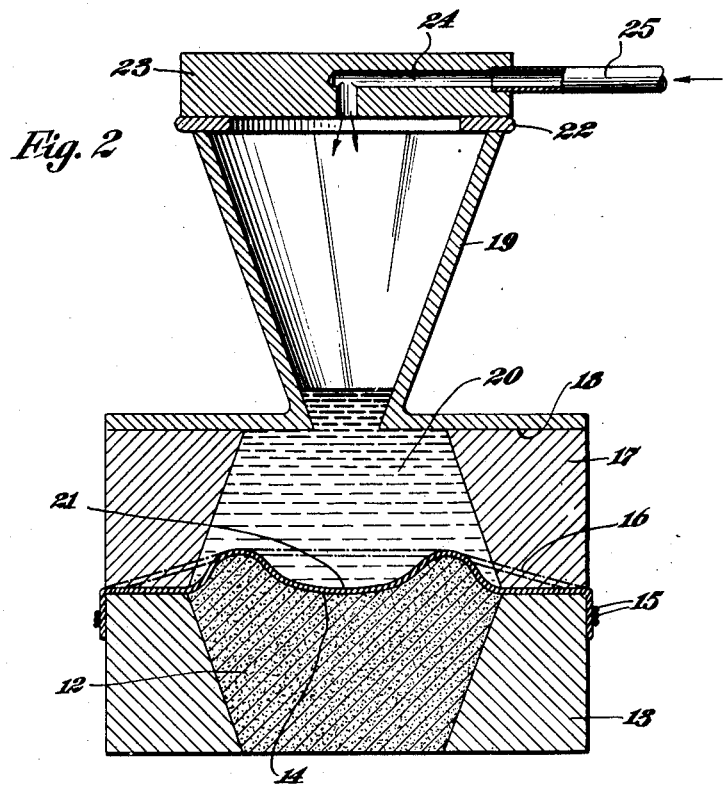
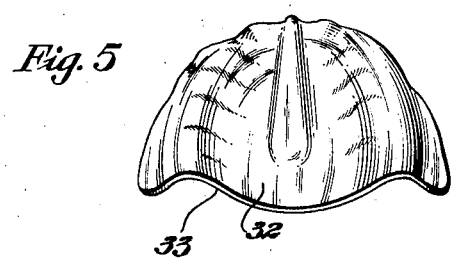
INVENTOR
Reiner W. Erdle,
BY
Frederick Breitenfeld
ATTORNEY

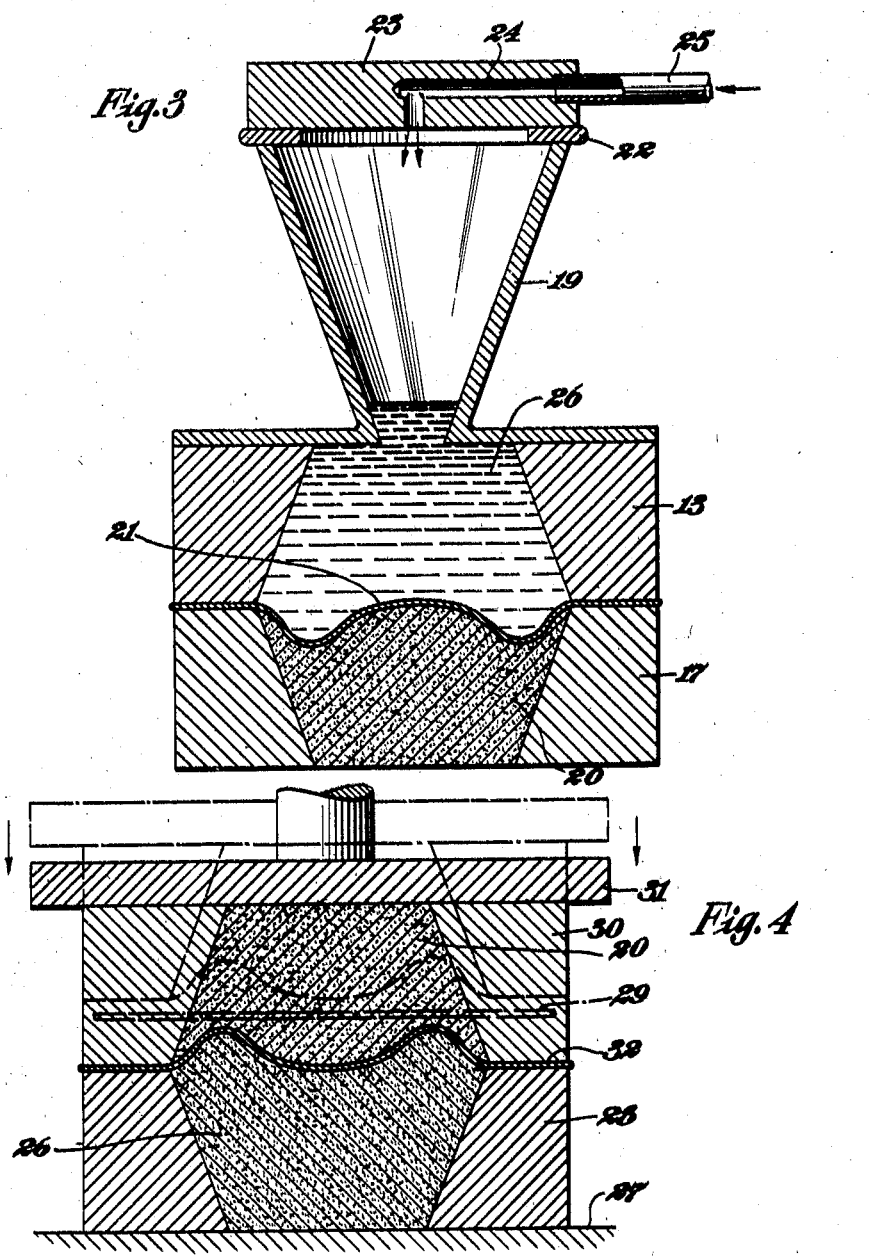

Patented Dec. 1, 1931

1,834,123

UNITED STATES PATENT OFFICE

REINER W. ERDLE, OF NEW YORK, N. Y., ASSIGNOR TO ANSTENAL LABORATORIES, INC., OF NEW YORK, N. Y., A CORPORATION OF NEW YORK

METHOD OF MAKING SWAGED DENTURE-BASES AND DIES FOR THE SAME

Application filed June 25, 1930. Serial No. 463,810.

My present invention relates generally to the process of swaging, and has particular reference to the manufacture of swaged denture-bases.

For purposes of illustrating the general nature of my invention, I have described the same in connection with the production of denture-bases, and particularly those which are made of metal, but it will be understood that numerous phases of my invention are not limited to this particular art.

The desirability of metallic denture-bases which are swaged or die-pressed from a flat sheet of metal, as distinguished from the bases which are cast, is well known. In the construction of complementary dies for swaging a blank of this character, one of the difficulties heretofore encountered has been caused by the fact that the swaged article or denture-base has a certain thickness which is slight, yet appreciable. Where the dies are constructed to nest perfectly, one with the other, it is obvious that pressing them together with a sheet of metal between them fails to provide for this thickness of the swaged article. As a result, where the metal of the swaged article is relatively hard, as in the case of steel or steel alloy, the swaging dies are subjected to considerable wear and may even be damaged during the process of pressing them together. On the other hand, where the material of the swaged article is relatively soft, as in the case of precious metal, the latter is caused to stretch and yield at various points so that extreme attenuations are produced at some portions of the finished article, while remaining portions are not accurately pressed into exact conformity with the convolutions of the dies.

It is a general object of my present invention to provide a process of manufacture which results in the production of swaged dentures of uniformly high character, each denture having a substantially uniform thickness throughout and having one surface accurately configured to the particular mouth irregularities for which it is intended. The procedural steps which I have provided for are relatively simple, inexpensive, and efficient, and are not beset with any of the difficulties illustratively referred to hereinbefore.

Briefly, one feature of my invention resides in providing a pair of complementary swaging dies, one of which has a face which is an accurate duplication of the irregularities desired on the finished denture-base, and the other of which has a complementary face which is almost, but not exactly, a perfect negative of the first-named face. In other words, when the two dies of my present invention are nested in operative relationship, their two faces do not fit snugly one within the other, but one of them is slightly spaced from the other face by substantially the same perpendicular distance at all points.

One of the main features of my invention lies in the manner in which I have provided for the construction of such complementary dies, for it must be remembered that the irregularities of contour incident to the production of dentures makes it impossible to construct dies of this character from measurements alone, but necessitates constant transference of the particular configuration involved from one casting, mold, or pattern to another.

Briefly stated, the practice of my invention involves the construction of one die to the face of which a thin spacer is applied, which spacer is adapted to conform snugly to the convolutions of said face. Thereafter, the second die is cast upon said spacer, the casting being accomplished by a material having a fusing point lower than that of the spacer. As a result, the spacer remains intact throughout the procedure and enables me to produce two complementary dies of the character hereinbefore mentioned, the operative face of one being a virtual reflection or negative duplication of the operative face of the other, but with a slight and uniform, perpendicular gap between the faces.

By means of my invention, I have been enabled to produce swaged articles (of the character typified by denture-bases) of greater uniformity and higher quality and in a more reliable and rapid manner than has been capable of accomplishment heretofore. Regardless of the material of which the swaged article may be made, I am enabled in a simple and expeditious manner to provide a surface thereon upon which the most minute details of the irregularities desired are faithfully reproduced.

Other features and advantages of my invention will be clearer after this specification has been read, and for the purpose of explaining the nature of my invention in greater detail, I have illustrated one manner of practicing the same in the accompanying drawings, wherein—

Figure 1 is a perspective view of a model or pattern;

Figure 2 is a cross-sectional elevational view of the apparatus employed during one step of my procedure;

Figure 3 is a view similar to Figure 2, illustrating a further step;

Figure 4 is an elevational cross-sectional view, illustrating the manner in which the completed dies are employed; and Figure 5 is a perspective view of the swaged article ultimately produced.

For the purpose of explaining the nature of my invention as it applies to the manufacture of swaged denture-bases, it may be assumed that the block or model 10 of Figure 1 is made of plaster or the like and is constructed by the doctor, or under his direction, from impressions taken from the mouth of a patient. Figure 1 may be considered to illustrate the model of the upper jaw, and this model or pattern is an exact duplication of the contours and configurations of the upper portion of the mouth. The surface 11 of the pattern 10 bears all the detailed convolutions of the roof of the mouth for which a denture-base is to be prepared.

In practicing my invention, I prefer to use the foregoing model for the purpose of constructing a master-die, which is an exact replica of the model, this die being made of relatively hard and durable metal or the like. An illustration of this master-die would appear very much like the model illustrated in Figure 1, the essential difference being that the master-die is of different material.

The master-die which I prefer to construct has a substantially frustro-conical shape; and in Figure 2 I have illustrated a master-die of this character at 12, the master-die being mounted within a flask 13 which is shaped with a frusto-conical opening adapted to receive the master-die in the manner shown.

In carrying out my invention, I first apply to the upper or configured surface 14 of the pattern 12 a spacing element of thin, flexible material adapted to conform to the various convolutions of the surface 14. For example, I have found it satisfactory to employ a sheet of thin rubber. Where a rubber sheet is used, it is stretched across the upper surface 14 and is retained in this condition by any suitable means, as, for example, the binder or rubber band 15 shown in Figure 2. When the rubber sheet is thus held in position, it is in a stretched condition and initially assumes the position illustrated by the dot-and-dash lines 16 of Figure 2.

I then apply to the flask 13 a similar flask 17, the latter being applied in inverted relationship and being held in this position by any suitable clamping means. To the top surface 18 of the flask 17 I then apply the funnel member 19 and clamp the same in position.

The molten metal of which the dies are to be cast is then poured into the funnel 19, and it will fill the flask 17 and extend slightly into the funnel 19 as illustrated at 20. The weight of the metal will press the spacing element 21 downwardly into conformity with the upper surface 14 of the pattern 12. The metal which I employ has a fusing point which is substantially lower than that of the spacing element 21; and, where a rubber sheet is employed as the spacing element, I have found tin alloys or the like to be suitable.

I prefer to accomplish the casting by means of gaseous pressure applied to the upper surface of the molten metal 20, and in Figure 2 I have illustrated a convenient way of carrying out this procedure. A washer 22 is applied to the upper edge of the funnel 19, and onto this washer is set a plate or block 23 which is bored as at 24. Communicating with the outer end of the bore 24 is a conduit 25 leading from a source of pressure. For example, an air pressure of approximately fifty (50) pounds should be sufficient.

The molten metal having thus been poured into the flask 17 and onto the spacer 21, and pressure having been permitted to act upon the upper surface of the metal, I proceed immediately to chill the metal 20, preferably by directing a stream of cooling liquid onto exterior surfaces of the flask 17. In a relatively short period of time, the casting operation is complete, and I thereupon remove the block 23, the washer 22, and the funnel 19. In removing the funnel 19, that portion of the metal which lay in the lower portion of the funnel and which has hardened into the form of a stump is broken off, the lower opening of the funnel 19 being sufficiently small and being suitably shaped so that this procedure is comparatively simple.

When the flasks 13 and 17 are separated, it will be found that the spacing element 21 has adhered firmly to the casting or die 20, and the binder 15 may thereupon be removed and discarded. The pattern 12 may also be removed from the flask 13 and set aside for the time being.

I then proceed to repeat the foregoing procedure, with the exception that the casting or die 20 is used in place of the original pattern 12. In Figure 3, for example, I have illustrated the position which the flask 17 is made to assume, the negative die 20 being still in position therein. The spacing element 21 adheres to the upper or configured surface of the die 20 and no special means need be provided for retaining it in place. The repetition of the procedure involves placing upon the flask 17 another flask, and I have illustratively shown the reemployment of the flask 13 for this purpose. The funnel 19 is again employed, as well as the washer 22 and the block 23, molten metal having first been poured into the funnel 19 so that it assumes the position within the flask 13 as shown at 26. The flask 13 is then chilled, and when the casting operation has been completed the block 23, the washer 22, and the funnel 19 are again withdrawn, the stump of the newly formed die 26 being broken off in the same manner as previously described.

The spacing element 21 will now be found to be adhering firmly to both dies 20 and 26, but the relatively low fusing point of the metal which I employ leaves the spacer 21 intact in this sandwiched relationship. Upon separating the flasks 17 and 13, the spacing element 21 is removed and may then be discarded.

The resultant dies 20 and 26 are negative and positive, respectively, with respect to the pattern or model of Figure 1. In other words, the die 26 is an exact duplication, so far as its operative surface is concerned, of the configured surface 11 of Figure 1 and of the configured surface of the master-die or pattern 12 which was originally employed. The operative surface or face of the die 20 is virtually a negative of the operative face of the die 26, but it is unique in the respect that it does not nest accurately and snugly with the operative face of the die 26.

The novel and advantageous characteristics of this pair of dies will be more fully appreciated when I point out the manner in which they are employed for the purpose of producing a finished swaged article of metal or the like. In Figure 4, I have illustrated a floor or base surface 27 of a pressure device, such as a hydraulic press. Onto this floor I place a flask 28 which may or may not be the same as that heretofore employed. The flask 28 carries the positive die 26 with its operative or configured face upward. Onto this face I apply a blank of metal indicated by the dot-and-dash lines 29, this metal being of malleable character, either precious or non-precious, and suitable to serve as a denture-base. A flask 30 is then applied in inverted relationship onto the flask 28, and it carries the negative die 20. Pressure is then exerted upon the flask 30, and I have illustratively shown the upper member 31 of the hydraulic press, this member moving in the direction of the arrows of Figure 4 from an initial position indicated by dot-and-dash lines to the full-line position shown.

The two dies 20 and 26 swage the metal until it ultimately assumes the sandwiched relationship shown at 32, and it is to be noted that the swaged article is permitted to assume a substantially uniform thickness throughout. The under-surface of the article 32, as viewed in Figure 4, is forced into exact conformity with the configured face of the die 26, and every minute detail of the convolutions is faithfully reproduced upon this under-surface. If the dies 20 and 26 were not of the present complementary character, wherein a substantially uniform gap is permitted to exist between them when they are separated, portions of the article 32 would be extremely attenuated, and a uniform thickness would not result, and the undersurface of the article would not accurately conform at every point to the convolutions of the surface of the positive die 26.

After the swaging operation has been completed, the denture-base appears substantially as shown in Figure 5, and the under-surface 33 will be found to fit snugly and nest firmly with the upper surface 11 of the original pattern or model 10. This is, of course, the object which was desired, since the under-surface 33 ultimately forms the operative surface of the completed denture, which, by suction, is retained in firm and comfortable relationship in contact with the roof of the mouth.

It will be understood that the article illustrated in Figure 5 is by no means the completed denture, a number of additional procedures being necessary, such as mounting of teeth, etc. These procedures are not in any way altered by my present invention, however, nor have they any bearing upon the features of my present process.

It will also be understood that my invention is not restricted to the art of denture manufacture. The production of two complementary dies of the present character, one of which has unique irregularities which are to be transferred by a swaging operation onto a blank of material, may be of equal value in other arts wherever uniquely irregular configurations are involved.

I wish to point out further that the dies produced by my present method are of an improved character inasmuch as their operative surfaces are smooth and dense and are not of the rough and porous character encountered in other processes. It seems that the provision of a spacer of the present character prevents the formation of air pockets or bubbles, and thereby results in producing operative surfaces of an extremely firm and smooth character.

Obviously, it is not essential in practicing my invention to employ a rubber sheet as the spacing element. Celluloid of a moldable character or similar materials may be used, the essential feature being that the fusing point of the metal ultimately cast onto the spacer be lower than that of the spacer so that the latter remains intact throughout the procedure.

So far as said phases of my invention are concerned, it is not essential that the dies be made of metal, nor that they be cast. Stone or plaster may be used, and such dies are made by simply permitting the material to set. Under certain circumstances, amalgam may be employed for the dies, as, for example, where crowns for teeth or the like are being swaged. In such a case, the material would simply be packed into position within the flask. Regardless of the material which is employed, the two dies produced in accordance with my present invention will have their operative faces separated by a gap which will compensate for the thickness of the material from which the swaged article is to be made.

In general, it will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. The herein-described method of making a swaged article having one surface accurately conforming to a uniquely irregular pattern, which consists in applying to said pattern a spacer of thin material adapted to form a layer snugly conforming to said pattern and having a thickness approximately equal to the thickness of the desired article, casting a pair of complementary swaging dies upon said spacer and on opposite sides thereof, respectively, and swaging said article between said complementary dies.

2. The herein-described method of making a swaged article having one surface accurately conforming to a uniquely irregular pattern, which consists in applying to said pattern a spacing element of thin sheet material adapted to conform itself to said pattern, casting a swaging die upon said element, removing said pattern and casting in its place a complementary swaging die, removing said spacing element, and swaging said article between said complementary dies.

3. The herein-described method of making a swaged article having one surface accurately conforming to a uniquely irregular pattern, which consists in applying to said pattern a spacing element of thin sheet material adapted to conform itself to said pattern, casting a swaging die upon said element, removing said pattern and casting in its place a comlpementary swaging die, said dies being cast of material having a lower fusing point than that of the spacing element, removing said spacing element, and then swaging the desired article between said complementary dies.

4. The herein-described method of making a pair of complementary swaging dies, which consists in constructing one of the dies, applying to the face thereof a spacer of thin material adapted to conform itself snugly to the convolutions of said face, and casting the complementary die upon said spacer; whereby the two dies when completed and nested will have complementary faces which are spaced by a slight and substantially uniform amount.

5. The herein-described method of making a pair of complementary swaging dies, which consists in constructing one of the dies, applying to the face thereof a spacing element of stretchable sheet material, casting the complementary die upon said element so as to cause the latter to conform snugly to the face of said first-named die, said die being cast of a material which has a lower fusing point than that of the spacing element so that the latter is not destroyed during the casting, and finally removing said spacing element.

In witness whereof I have signed this specification this 16th day of June, 1930.

REINER W. ERDLE.